(12) United States Patent
Ryu (10) Patent No.: US 11,176,048 B2
(45) Date of Patent: Nov. 16, 2021

(54) DATA STORAGE DEVICE, OPERATION METHOD THEREOF, AND CONTROLLER THEREFOR

(71) Applicant: SK hynix Inc., Gyeonggi-do (KR)

(72) Inventor: Tae Kyu Ryu, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 162 days.

(21) Appl. No.: 16/559,123

(22) Filed: Sep. 3, 2019

(65) Prior Publication Data

US 2020/0218661 A1 Jul. 9, 2020

(30) Foreign Application Priority Data

Jan. 7, 2019 (KR) .................. 10-2019-0001695

(51) Int. Cl.
*G06F 12/0873* (2016.01)
*G06F 12/02* (2006.01)
*G06F 3/06* (2006.01)

(52) U.S. Cl.
CPC ........ *G06F 12/0873* (2013.01); *G06F 3/0607* (2013.01); *G06F 3/0619* (2013.01); *G06F 3/0652* (2013.01); *G06F 12/0246* (2013.01); *G06F 3/0679* (2013.01)

(58) Field of Classification Search
CPC ............. G06F 12/0873; G06F 12/0246; G06F 3/0652; G06F 3/0619; G06F 3/0607; G06F 3/0679; G06F 2212/7206; G06F 2212/7203; G06F 2212/7201; G06F 2212/1016; G06F 3/064; G06F 3/061; G06F 3/0631; G06F 3/0638; G06F 3/0658; G06F 3/0656; G06F 3/0688
See application file for complete search history.

(56) References Cited

U.S. PATENT DOCUMENTS

| | | | | |
|---|---|---|---|---|
| 9,501,392 | B1 * | 11/2016 | Weingarten | G06F 12/023 |
| 2006/0212674 | A1 * | 9/2006 | Chung | G06F 12/0246 |
| | | | | 711/202 |
| 2007/0106849 | A1 * | 5/2007 | Moore | G06F 16/172 |
| | | | | 711/137 |
| 2008/0228995 | A1 * | 9/2008 | Tan | G06F 21/32 |
| | | | | 711/103 |

(Continued)

FOREIGN PATENT DOCUMENTS

KR 1020150029401 3/2015

*Primary Examiner* — Francisco A Grullon
(74) *Attorney, Agent, or Firm* — IP & T Group LLP (57) ABSTRACT

A data storage device may include a storage that store data in a plurality of physical storage spaces to which physical addresses are assigned, respectively, and a controller that control the storage, wherein the controller includes a mapping table of the physical addresses corresponding to logical addresses managed by a host, and wherein the controller is further configured to read data, in a primary read operation, from a physical storage space of a physical address corresponding to a logical address requested to be read by the host among the plurality of physical storage spaces according to the mapping table, obtain a normal physical address corresponding to the logical address requested to be read through the mapping table when the data read in the primary read operation is erased data; and read data, in a secondary read operation, from a physical storage space of the normal physical address.

13 Claims, 8 Drawing Sheets

(56) References Cited

U.S. PATENT DOCUMENTS

| | | | |
|---|---|---|---|
| 2013/0138867 A1* | 5/2013 | Craft | G06F 3/061 |
| | | | 711/103 |
| 2013/0205070 A1* | 8/2013 | Koseki | G06F 3/0608 |
| | | | 711/103 |
| 2016/0062883 A1* | 3/2016 | Byun | G06F 12/0246 |
| | | | 711/103 |
| 2016/0253266 A1* | 9/2016 | Park | G06F 12/0238 |
| | | | 711/154 |
| 2018/0293174 A1* | 10/2018 | Song | G06F 12/1009 |
| 2019/0018613 A1* | 1/2019 | Byun | G06F 3/0611 |

\* cited by examiner

DATA STORAGE DEVICE, OPERATION METHOD THEREOF, AND CONTROLLER THEREFOR

CROSS-REFERENCES TO RELATED APPLICATION

The present application claims priority under 35 U.S.C. § 119(a) to Korean application number 10-2019-0001695, filed on Jan. 7, 2019, in the Korean Intellectual Property Office, which is incorporated herein by reference in its entirety.

BACKGROUND

1. Technical Field

Various embodiments generally relate to a semiconductor integrated apparatus, and more particularly, to a data storage device, an operation method thereof, and a controller therefor.

2. Related Art

A storage device is electrically connected to a host device and performs an access operation on data at a request of the host device. The storage capacity of portable electronic devices has gradually increased to accommodate more and different types of data. A relatively large capacity storage medium is employed in order to provide various functions based on multimedia data. A flash memory-based storage medium is often used for this purpose.

A flash memory based storage medium has advantages such as large capacity, nonvolatility, low unit cost, low power consumption, and high speed data processing.

Processing data quickly and accurately is a key factor in determining the performance and reliability of a data storage device. To this end, there is a need for a technology capable of efficiently operating a mapping table between logical addresses and physical addresses and accessing a storage medium at a high speed through the mapping table.

SUMMARY

In an embodiment, a data storage device may include: a storage configured to store data in a plurality of physical storage spaces to which physical addresses are assigned, respectively; and a controller configured to control the storage, wherein the controller includes a mapping table of the physical addresses corresponding to logical addresses managed by a host, and wherein the controller is further configured to: read data, in a primary read operation, from a physical storage space of a physical address corresponding to a logical address requested to be read by the host among the plurality of physical storage spaces according to the mapping table; obtain a normal physical address corresponding to the logical address requested to be read through the mapping table when the data read in the primary read operation is erased data; and read data, in a secondary read operation, from a physical storage space of the normal physical address.

In an embodiment, an operation method of a data storage device, which includes a storage that stores data in a plurality of physical storage spaces to which physical addresses are assigned, respectively, and a controller that controls the storage and includes a mapping table among the physical addresses corresponding to logical addresses managed by a host, may include: reading, in a primary reading operation performed by the controller, data from a physical storage space assigned a physical address corresponding to a logical address requested to be read by the host among the plurality of physical storage spaces according to the mapping table; determining, by the controller, whether the data read in the primary reading operation is erased data; obtaining, by the controller, when the data read in the primary reading operation is erased data, a normal physical address corresponding to the logical address requested to be read through the mapping table; and reading, in a secondary reading operation performed by the controller data from a physical storage space of the normal physical address.

In an embodiment, a controller, which controls a storage for storing data in a plurality of physical storage spaces to which physical addresses are assigned, respectively, may include: a mapping table configured to store mapping information of the physical addresses corresponding to logical addresses managed by a host; an abnormal pattern detector configured to determine whether data, which is read in a primary read operation from a physical storage space assigned a physical address corresponding to a logical address requested to be read by the host among the plurality of physical storage spaces according to the mapping table, is erased data; a write pattern determination component configured to determine whether physical addresses mapped to a set number of logical addresses before and after the logical address requested to be read among the physical addresses of the mapping table have a sequential pattern in which the physical addresses sequentially increase or decrease according to an order of the logical addresses when the data read in the primary read operation is the erased data; an address determination component configured to obtain a normal physical address corresponding to the logical address requested to be read, on the basis of the determination of the write pattern determination component; and a reading circuit configured to read data in a secondary read operation from a physical storage space of the normal physical address.

In an embodiment, an operation method of a controller may include controlling a memory device to read data indicated by a read-requested physical address; determining, when the read data is erased data, whether neighboring physical addresses of the read-requested physical address have a sequential pattern or a random pattern; controlling the memory device to read, when the neighboring physical addresses are determined to have the sequential pattern, data of a physical address missing within the sequential pattern; and controlling the memory device to read, when the neighboring physical addresses are determined to have the random pattern, data of a physical address missing within an arranged pattern of the neighboring physical addresses arranged in order of an address number, wherein the read-requested physical address is mapped to a read-requested logical address provided from a host.

DETAILED DESCRIPTION

A data storage device, an operation method thereof, and a controller therefor are described in more detail below with reference to the accompanying drawings through various examples of embodiments. Throughout the specification, reference to "an embodiment" or the like is not necessarily to only one embodiment, and different references to any such phrase is not necessarily to the same embodiment(s).

Figure 1:
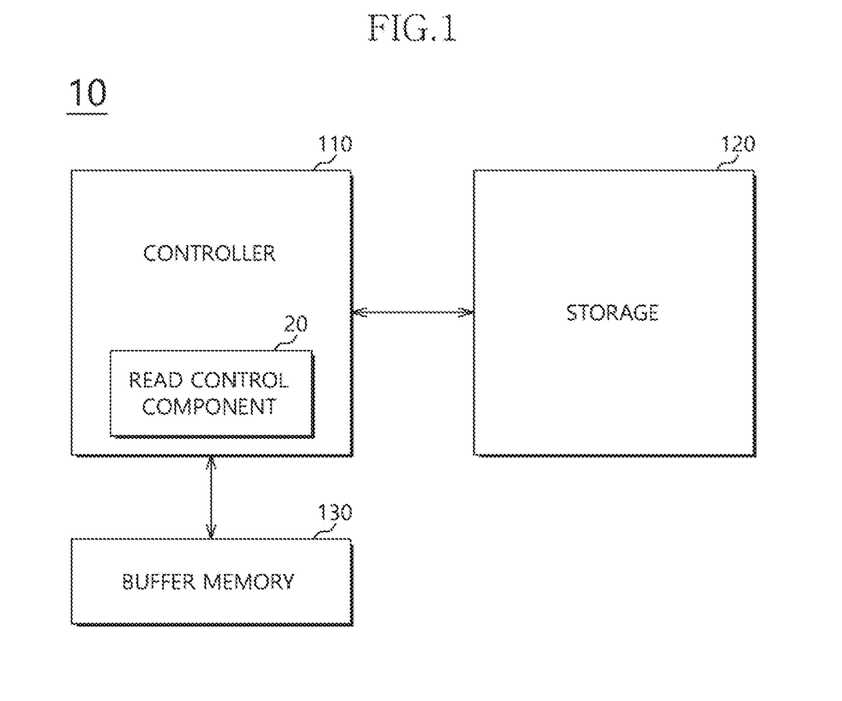
FIG. 1 is a diagram illustrating a configuration of a data storage device in accordance with an embodiment.

FIG. 1 is a diagram showing a configuration of a data storage device in accordance with an embodiment.

Referring to FIG. 1, a data storage device 10 may include a controller 110, a storage 120, and a buffer memory 130.

The controller 110 may control the storage 120 in response to a request of a host device. For example, the controller 110 may allow data to be programmed in the storage 120 at a program (write) request of the host device. Furthermore, the controller 110 may provide the host device with the data written in the storage 120 in response to a read request of the host device.

The storage 120 may write data or output the written data under the control of the controller 110. The storage 120 may include a volatile or nonvolatile memory. In an embodiment, the storage 120 may be implemented using any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin torque transfer magnetic RAM (STT-MRAM). The storage 120 may have a hierarchical structure having a page including a plurality of memory cells, a block including at least one page, a plane including at least one block, a die including at least one plane, and the like. Read and write (program) operations may be performed in units of pages, for example, and an erase operation may be performed in units of blocks, for example. In order to improve data input/output speed, a processor of data to be read or written may be configured according to provide a suitable data input/output speed. The storage 120 may include single-level cells, each of which stores one-bit data or multi-level cells, each of which is stores multi-bit data.

The buffer memory 130 may serve as a space capable of temporarily storing data when the data storage device 10 inputs/outputs the data in cooperation with the host device.

In an embodiment, the controller 110 may include a read control component 20. When the data storage device 10 performs a read operation in response to a host command, and an error occurs in which abnormal data or null data is read, the read control component 20 may identify the reason of the error and control the read operation to read normal data.

The reason why abnormal data is read may be one of the following reasons.

TABLE 1

| Reason 1 | Access to an erased area, instead of an area requested to be read, due to mapping table corruption |
|---|---|
| Reason 2 | A read error occurs although an area requested to be read is accessed |

The read control component 20 may identify the reason why abnormal data is read according to the state of a physical address stored in the mapping table. When the mapping table is corrupted and abnormal data is read, the read control component 20 may read normal data by searching for a normal physical address corresponding to an address requested to be read. When abnormal data is read due to the occurrence of a read error, the read control component 20 may report the occurrence of such error to the host device.

In an embodiment, the mapping table may be stored in the storage 120 and may be loaded to a RAM 1153 when the data storage device 10 is powered on.

Figure 2:
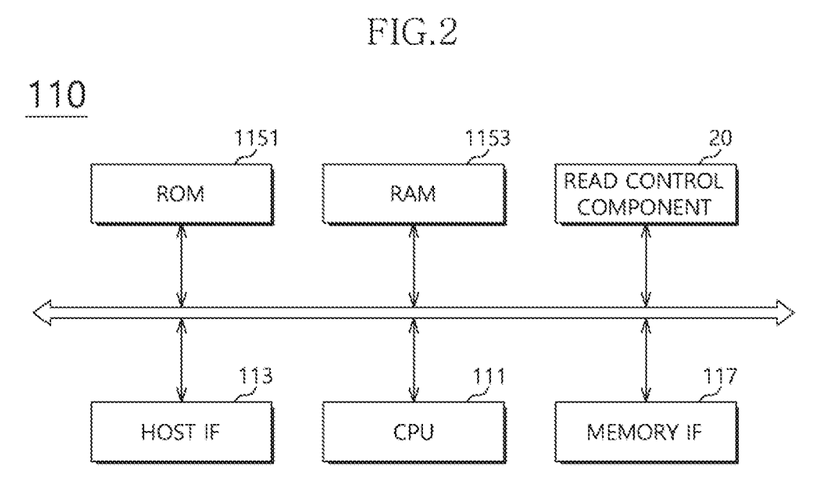
FIG. 2 is a diagram illustrating a configuration of a controller in accordance with an embodiment.

FIG. 2 is a diagram of a configuration of a controller in accordance with an embodiment.

Referring to FIG. 2, the controller 110 may include a central processing unit (CPU) 111, a host interface (IF) 113, an ROM 1151, the RAM 1153, a memory interface (IF) 117, and the read control component 20.

The CPU 111 may be configured to transfer various types of control information required for a data read or write operation for the storage 120 to the host IF 113, the RAM 1153, and the memory IF 117. In an embodiment, the CPU 111 may operate according to firmware provided for various operations of the data storage device 10. In an embodiment, the CPU 111 may perform a function of a flash translation layer (FTL) for performing garbage collection, address mapping, wear leveling and the like for managing the storage 120, a function of detecting and correcting an error of data read from the storage 120, and the like.

Figure 3:
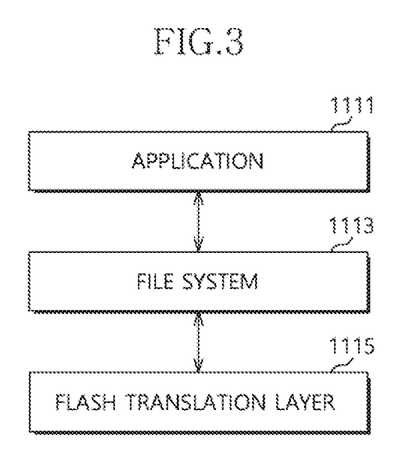
FIG. 3 is a diagram illustrating a control structure of a central processing unit in accordance with an embodiment.

FIG. 3 is a diagram illustrating a control structure of the CPU in accordance with an embodiment.

Referring to FIG. 3, an application 1111 may be firmware that processes user data. The application 1111 may generate a command for storing the user data in the storage 120 in response to user's input and transfer the command to a file system 1113.

The file system 1113 may store the user data in the storage 120. The file system 1113 may allocate a logical address, in which the user data is to be stored, in response to the command from the application 1111.

An FTL 1115 may translate the logical address received from the file system 1113 into a physical address, and store the physical address in the mapping table. The FTL 1115 may translate a logical address into a physical address or a physical address into a logical address by using mapping table information. In an embodiment, the FTL 1115 may process an address by using a page mapping method, a block mapping method, or a hybrid mapping method.

The host IF 113 may provide a communication channel for receiving a command and a clock signal from the host device and controlling data input/output under the control of the CPU 111. Particularly, the host IF 113 may provide a physical connection between the host device and the data storage device 10. The host IF 113 may provide interfacing with the data storage device 10 in correspondence with a bus format of the host device. The bus format of the host device may include at least one of standard interface protocols, such as a secure digital, a universal serial bus (USB), a multimedia card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and/or a universal flash storage (UFS).

The ROM 1151 may store program codes required for the operation of the controller 110, for example, firmware or software, and store code data and the like used by the program codes.

The RAM 1153 may store program codes and data read from the ROM 1151. The RAM 1153 may store data for the operation of the controller 110 or data generated by the controller 110.

The memory IF 117 may provide a communication channel for signal transmission/reception between the controller 110 and the storage 120. The memory IF 117 may write data, which has been temporarily stored in the buffer memory, in the storage 120 under the control of the CPU 111. Furthermore, the memory IF 117 may transfer data read from the storage 120 to the buffer memory for temporary storage.

When the data storage device 10 performs the read operation in response to the host command, and an error occurs in which abnormal data is read, the read control component 20 may identify the reason of the error and control to have normal data read.

When a write request is received from the host device, the controller 110 may allocate a physical space in the storage 120 so as to be continuous to an address of a physical space allocated for a previous write request, perform a write operation, and construct resultant logical to physical (L2P) mapping information. Accordingly, when physical addresses to be stored in an L2P mapping table are aligned in ascending order or descending order, the addresses may have continuous values.

In an embodiment, when user data is programmed by a sequential write technique, physical addresses mapped to sequentially continuous logical addresses may also have sequentially continuous values.

In an embodiment, when user data is programmed by a random write technique, if physical addresses in the mapping table are scanned and aligned, the addresses may have continuous values.

Therefore, when abnormal data is read, the read control component 20 may identify the reason why the abnormal data is read according to the state of the physical addresses in the mapping table. When an unintended space is accessed and abnormal data is read due to the mapping table corruption, a normal physical address may be searched for and data may be read by accessing the physical space found in the search.

Figure 4:
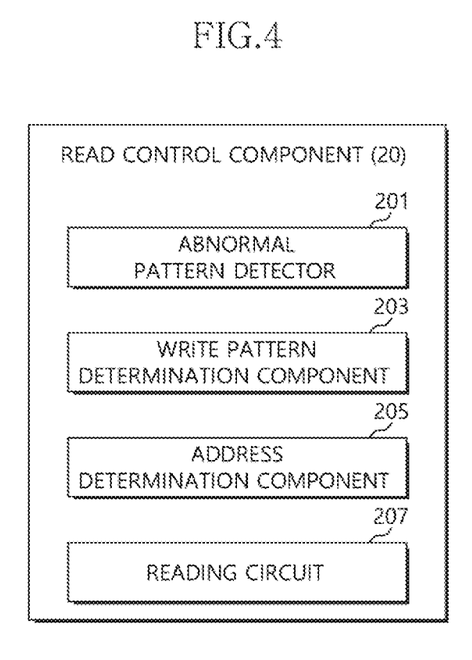
FIG. 4 is a diagram of a configuration of a read control component in accordance with an embodiment.

FIG. 4 is a diagram of the read control component in accordance with an embodiment.

Referring to FIG. 4, the read control component 20 may include an abnormal pattern detector 201, a write pattern determination component 203, an address determination component 205, and a reading circuit 207.

The abnormal pattern detector 201 may determine whether abnormal data is read from an accessed area in response to a read request of the host device. In an embodiment, the abnormal data may have a hexadecimal value 'FFh' indicating an erased state; however, the present invention is not limited to any specific form of data representation. From an area where valid data has been written, valid data programmed by a write operation may be read. However, from an area, other than a valid area, where data has been erased, data having a hexadecimal value 'FFh' indicating that a corresponding page is in an erased state may be read.

The write pattern determination component 203 may determine whether data neighboring abnormal data in the storage 120 has been sequentially written or randomly written by referring to the mapping table as the abnormal pattern detector 201 detects that abnormal data is read.

In an embodiment, the write pattern determination component 203 may detect physical addresses mapped to a set number of logical addresses before and after a logical address LPN_rd_req requested to be read. When the detected physical addresses have a pattern sequentially increased or decreased according to the logical address order, it may be determined that data of the detected physical addresses has been programmed by the sequential write method. When the detected physical addresses do not have the sequential pattern according to the logical address order, it may be determined that the data of the detected physical addresses has been programmed by the random write method.

On the basis of the determination result of the write pattern determination component 203 and the address requested to be read, the address determination component 205 may search for a normal physical address.

In an embodiment, when it is determined that the data of the detected physical addresses has been programmed by the sequential write method, physical addresses including the detected physical addresses corresponding to logical addresses sequentially increasing or decreasing also need to have a pattern sequentially increased or decreased. Accordingly, the address determination component 205 may predict a physical address value satisfying the sequential pattern and determine the predicted address value as a normal physical address corresponding to the logical address LPN_rd_req requested to be read.

That is, when the physical addresses mapped to the set number of logical addresses before and after the logical address LPN_rd_req requested to be read are detected, a missing address may be searched for within the physical addresses including the detected physical addresses having a sequentially increasing or decreasing pattern. The missing address found in the search may be determined as the normal physical address.

In an embodiment, when it is determined that the data of the detected physical addresses has been programmed by the random write method, the address determination component 205 may scan physical addresses in the mapping table, except for the physical address mapped to the logical address LPN_rd_req requested to be read, align the scanned physical addresses in descending order or ascending order, and search the aligned physical addresses for a missing address. Then, the address determination component 205 may determine the physical address, which is missing within the aligned physical addresses, as a normal physical address corresponding to the logical address LPN_rd_req requested to be read.

When there are a plurality of missing addresses within the aligned physical addresses, the address determination component 205 may read data from an area corresponding to the missing addresses, and finally determine a physical address, a logical address corresponding to which is the same as the logical address LPN_rd_req requested to be read among logical addresses included in meta data of the read data, as the normal physical address among the missing addresses.

The reading circuit 207 may read data stored in an area corresponding to the normal physical address searched by the address determination component 205, and provide the read data to the host device.

In an embodiment, the reading circuit 207 may read data from the storage 120 of the area requested to be read by the host device, determine the logic level of the data, and detect and correct an error. The reading circuit 207 may read the data on the basis of any suitable read algorithm.

Figure 5:
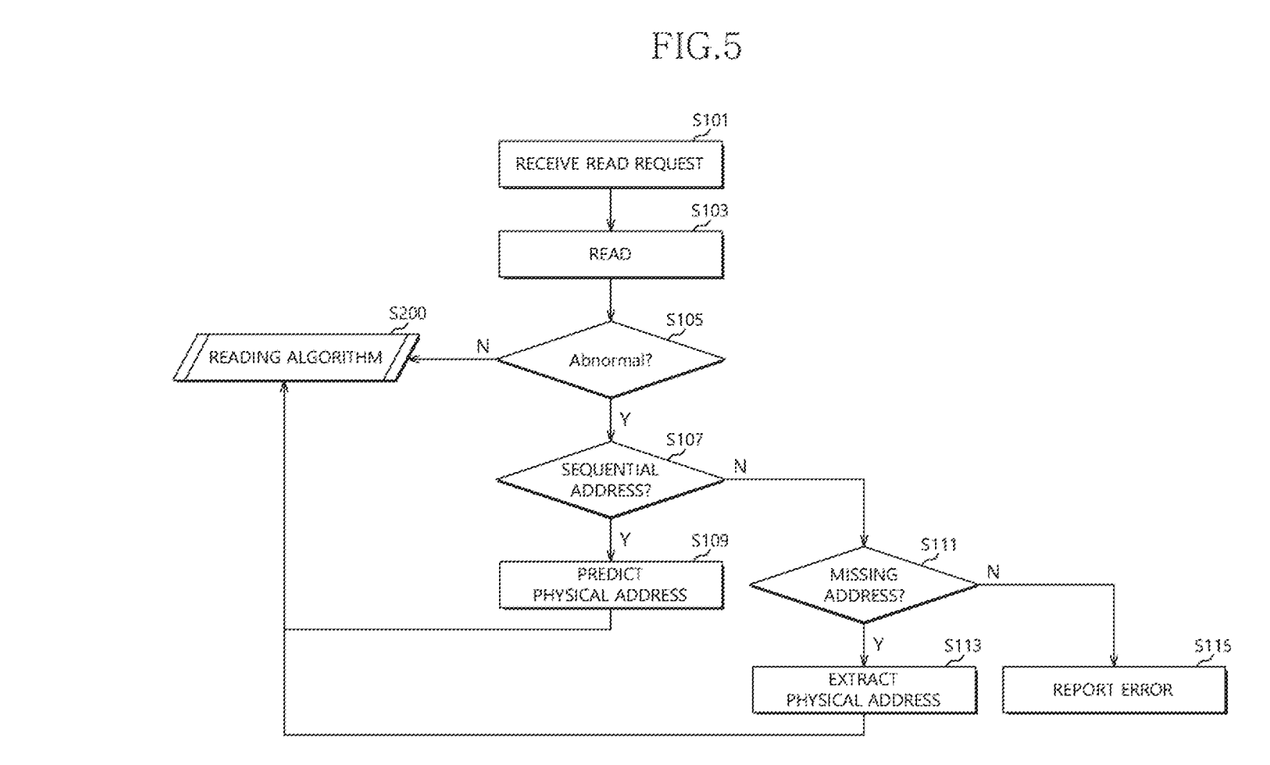
FIG. 5 is a flowchart illustrating an operation method of the data storage device in accordance with an embodiment.

FIG. 5 is a flowchart illustrating an operation method of the data storage device in accordance with an embodiment.

Referring to FIG. 5, as the host device transmits a read command and a logical address LPN_rd_req to the data storage device 10 (S101), the read control component 20 may access an area indicated by a physical address corresponding to the logical address LPN_rd_req requested to be read and read data from the mapping table (S103). Then, the read control component 20 may determine whether the read data is abnormal data (S105).

When the data read from the address requested to be read is abnormal data (Y in S105), the read control component 20 may determine whether a write pattern of data neighboring the read data is a sequential write pattern by referring to the mapping table (S107).

In an embodiment, the read control component 20 may detect physical addresses mapped to a set number of logical addresses before and after a logical address LPN_rd_req requested to be read, and determine that data of the detected physical addresses has been programmed by the sequential write method when the detected physical addresses have a pattern sequentially increased or decreased according to the logical address order.

When the data of the detected physical addresses has the sequential write pattern, the read control component 20 may search for a missing address within physical addresses including the detected physical addresses having a sequentially increasing or decreasing pattern and determine the missing address found in the search as a normal physical address (S109).

On the other hand, when the data of the detected physical addresses does not have the sequential write pattern (N in S107), the read control component 20 may determine whether the write pattern of the data of the detected physical addresses is a random write pattern and determine whether a missing address exists in the mapping table (S111).

In an embodiment, the read control component 20 may scan physical addresses in the mapping table, align the scanned physical addresses in descending order or ascending order, and search the aligned physical addresses for a missing address.

Then, the read control component 20 may determine the physical address that is missing within the aligned physical addresses, as a normal physical address corresponding to the logical address LPN_rd_req requested to be read.

When there are multiple missing addresses within the aligned physical addresses, the read control component 20 may read data from an area corresponding to the missing addresses, and determine therefrom, a physical address corresponding to a logical address that is the same as the logical address LPN_rd_req requested to be read among logical addresses in meta data of the read data, as the normal physical address (S113).

On the other hand, when the data of the detected physical addresses has been written in the random write pattern but there is no missing address in the mapping table (N in S111), it indicates that abnormal data is read due to the occurrence of a read error, and therefore the read control component 20 may report the occurrence of the error to the host device (S115).

Figure 6:
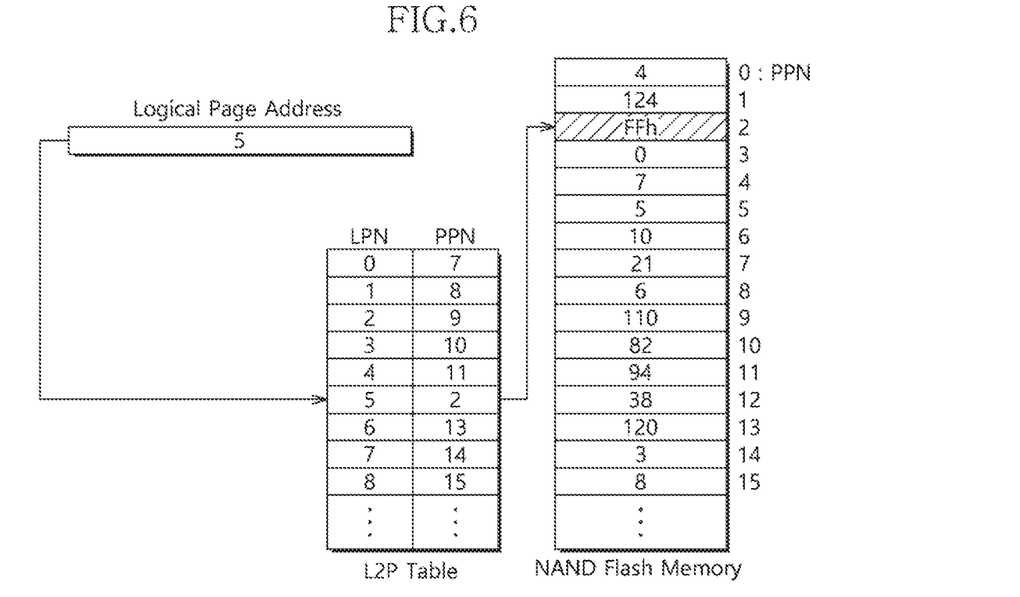
FIG. 6 and FIG. 7 are diagrams illustrating a normal physical address search method according to a write mode.
Figure 7:
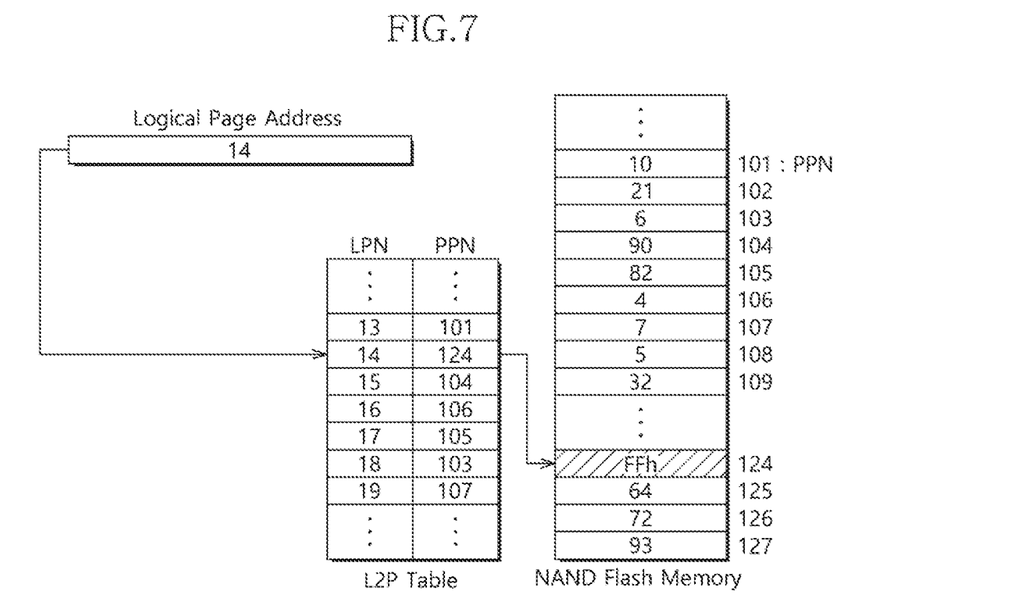

FIG. 6 and FIG. 7 are diagrams illustrating a normal physical address search method according to a write mode.

With reference to FIG. 6, the normal physical address search method is described in the context of data of the detected physical addresses having a sequential write pattern.

When the logical address LPN_rd_req according to the read request of the host device is 5, the read control component 20 may identify a physical address PPN mapped to the logical address LPN_rd_req (=5) as 2, and access an area of the PPN (=2) of the storage 120 to read data indicated by the PPN (=2).

In such a case, since abnormal data having the value 'FFh' is read from the area of the PPN (=2) of the storage 120, it is necessary to search for a normal physical address.

The read control component 20 may detect physical addresses mapped to a set number of logical addresses before and after the logical address LPN_rd_req requested to be read. When the detected physical addresses have a pattern sequentially increased or decreased according to the logical address order, the read control component 20 may determine that the data of the detected physical addresses has been programmed by the sequential write method.

For example, physical addresses PPN 9, 10, 11, 13, 14, and 15 mapped to six logical addresses LPN 2 to 4 and 6 to 8 before and after the logical address LPN_rd_req (=5) requested to be read may be detected. Since the detected physical addresses have a pattern that sequentially increases according to the logical address order, the data of the detected physical addresses may be determined to have the sequential write pattern.

In addition, a missing address PPN (=12) within the physical addresses including the detected physical addresses having the sequentially increasing pattern may be searched for, and determined as the normal physical address.

With reference to FIG. 7, the normal physical address search method is described in the context of data of the detected physical addresses having a random write pattern.

When the logical address LPN_rd_req according to the read request of the host device is 14, the read control component 20 may identify a physical address PPN mapped to the logical address LPN_rd_req (=14) as 124, and access an area of the PPN (=124) of the storage 120 to read data indicated by the PPN (=124).

In such a case, since abnormal data having the value 'FFh' is read from the area of the PPN (=124) of the storage 120, it is necessary to search for a normal physical address.

The read control component 20 may scan physical addresses in the mapping table, except for the physical address PPN (=124) mapped to the logical address LPN_rd_req requested to be read, and detect PPN 101, 104, 106, 105, 103, and 107. Then, the read control component 20 may align the scanned physical addresses in descending order or ascending order, and search for a missing address. For example, when the detected PPN 101, 104, 106, 105, 103, and 107 are aligned in the ascending order, the physical addresses may be aligned as 101, 103, 104, 105, 106, and 107 and a missing physical address PPN (=102) may be searched for and found within the aligned PPNs. Accordingly, the physical address PPN (=102) found in the search may be determined as a normal physical address corresponding to the logical address LPN_rd_req requested to be read.

Referring back to FIG. 5, as a result of the confirmation of step S105, when abnormal data is not read, the read control component 20 may predict the normal physical address through step S109, determine the normal physical address through step S113, and then perform a set reading algorithm S200.

Figure 8:
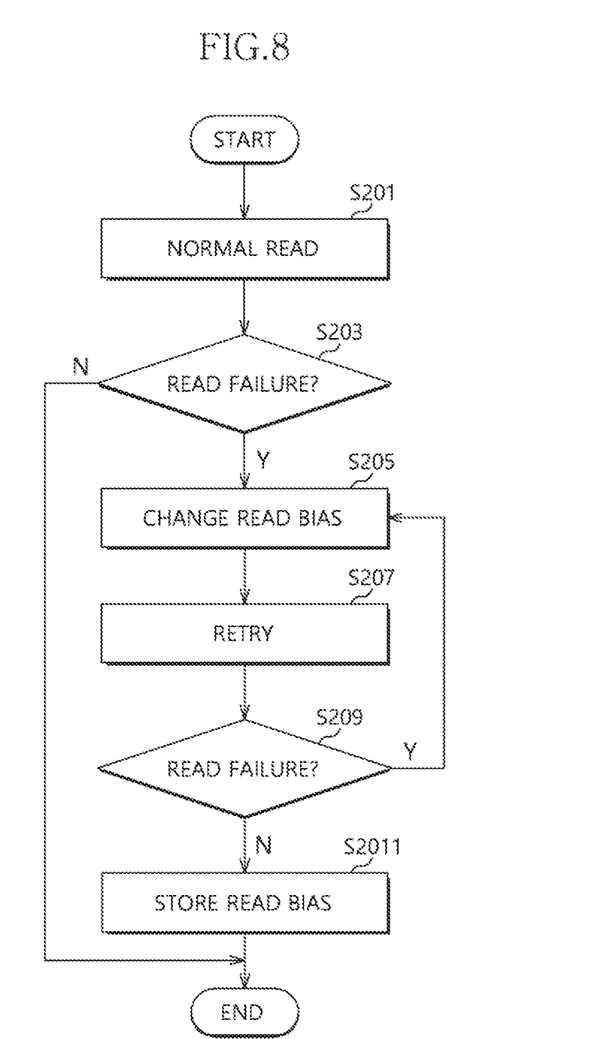
FIG. 8 is a flowchart illustrating a data reading method in accordance with an embodiment.

FIG. 8 is a flowchart illustrating a data reading method in accordance with an embodiment.

In an embodiment, a normal read operation may be performed to determine the level of data read from the storage 120 by using a set initial read bias (S201).

As a result of performing the normal read operation, it may be determined whether the read operation has failed (S203). The failure of the read operation may represent that it is not possible to correct an error of the read data.

When the read operation has failed (Y in S203), the read control component 20 may change the read bias (S205). In order to change the read bias, a history read bias table of previous read biases may be used; however, the present embodiment is not limited thereto. The read biases in the history read bias table may be those used in previous successful read operations.

When the read bias is changed, the read control component 20 may retry the read operation with the changed read bias (S207). As a result of the read retry, the read control component 20 may confirm whether the read retry has failed (S209), and store the changed read bias when the read retry succeeds (S211).

On the other hand, when the read retry has failed, the step S205 of changing the read bias may be performed again.

According to the read scheme illustrated in FIG. 8, since a read voltage is determined based on a read bias that has been applied in a successful past read operation, the probability of correcting an error in the read data advantageously increases.

Figure 9:
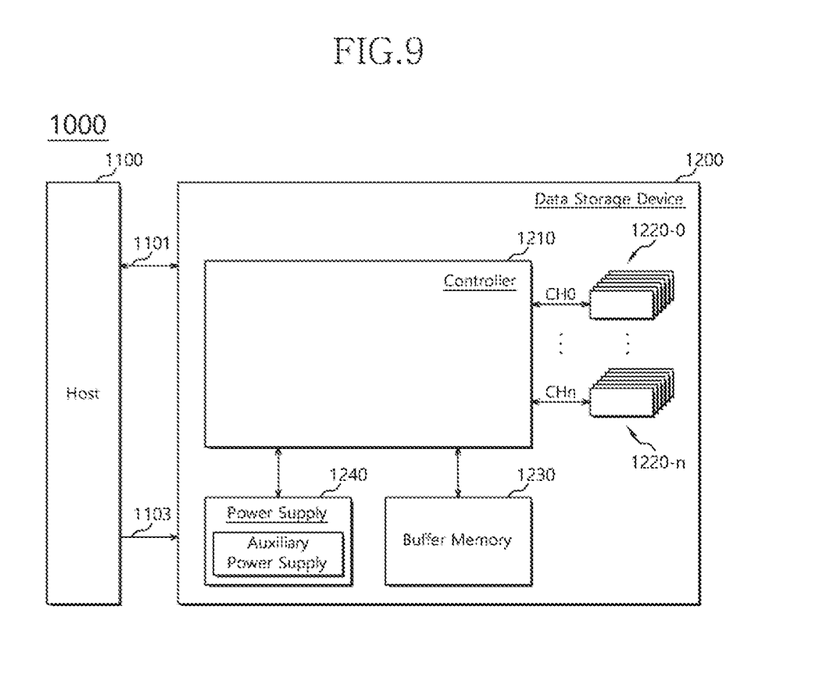
FIG. 9 is a diagram illustrating a data storage system in accordance with an embodiment.

FIG. 9 is a diagram illustrating a data storage system 1000, in accordance with an embodiment.

Referring to FIG. 9, the data storage system 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) component, and a memory interface. In an embodiment, the controller 1210 may configured as controller 110 shown in FIGS. 1 to 4.

The host device 1100 may exchange a signal with the data storage device 1200 through the signal connector 1101. The signal may include a command, an address, data, and related information.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103 to the inside of the data storage device 1200. The power supply 1240 may include an auxiliary power supply. The auxiliary power supply may supply power to allow the data storage device 1200 to be properly terminated when a sudden power interruption occurs. The auxiliary power supply may include bulk-capacity capacitors sufficient to store the needed charge.

The signal connector 1101 may be configured as any of various types of connectors depending on an interface scheme between the host device 1100 and the data storage device 1200.

The power connector 1103 may be configured as any of various types of connectors depending on a power supply scheme of the host device 1100.

Figure 10:
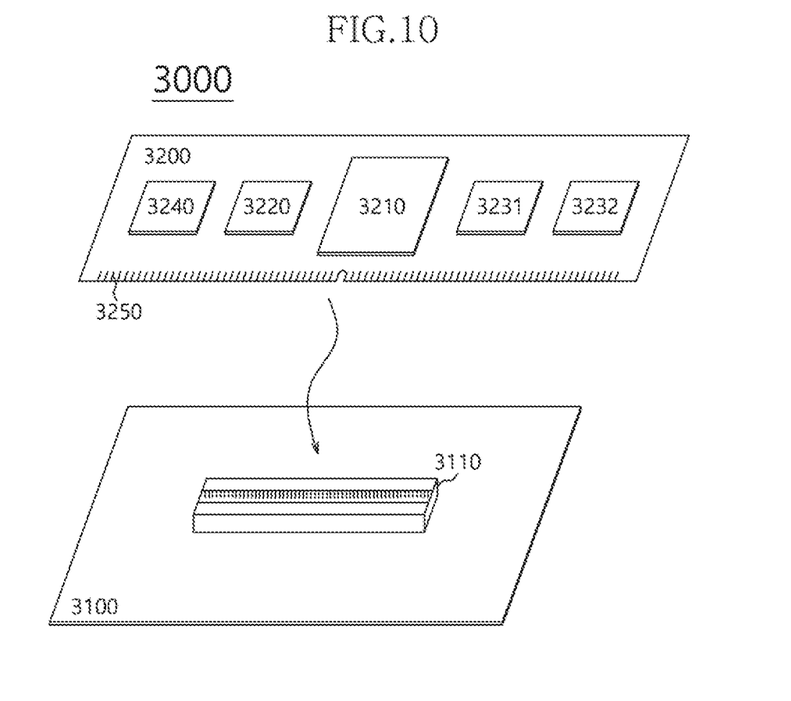
FIG. 10 and FIG. 11 are diagrams illustrating a data processing system in accordance with an embodiment.

FIG. 10 is a diagram illustrating a data processing system 3000, in accordance with an embodiment. Referring to FIG. 10, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 to 4.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and the like, and power may be transferred between the host device 3100 and the memory system 3200. The connection terminal 3250 may be configured as any of various types depending on an interface scheme between the host device 3100 and the memory system 3200. The connection terminal 3250 may be disposed on a side of the memory system 3200, as shown.

Figure 11:
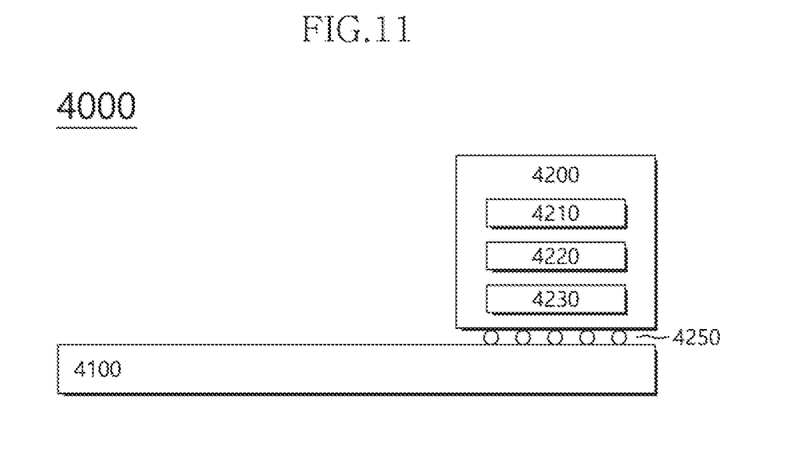

FIG. 11 is a diagram illustrating a data processing system 4000 in accordance with an embodiment. Referring to FIG. 11, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 to 4.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 12:
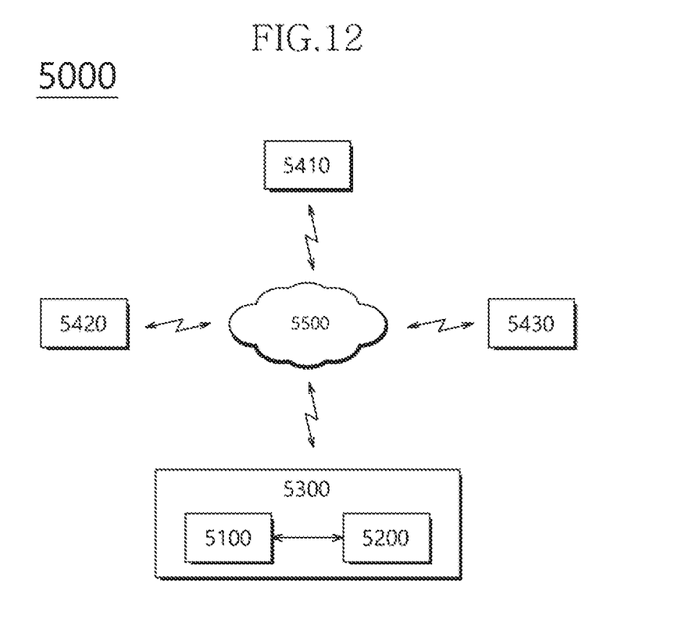
FIG. 12 is a diagram illustrating a network system including a data storage device in accordance with an embodiment.

FIG. 12 is a diagram illustrating a network system 5000 including a data storage device, in accordance with an embodiment. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

Figure 13:
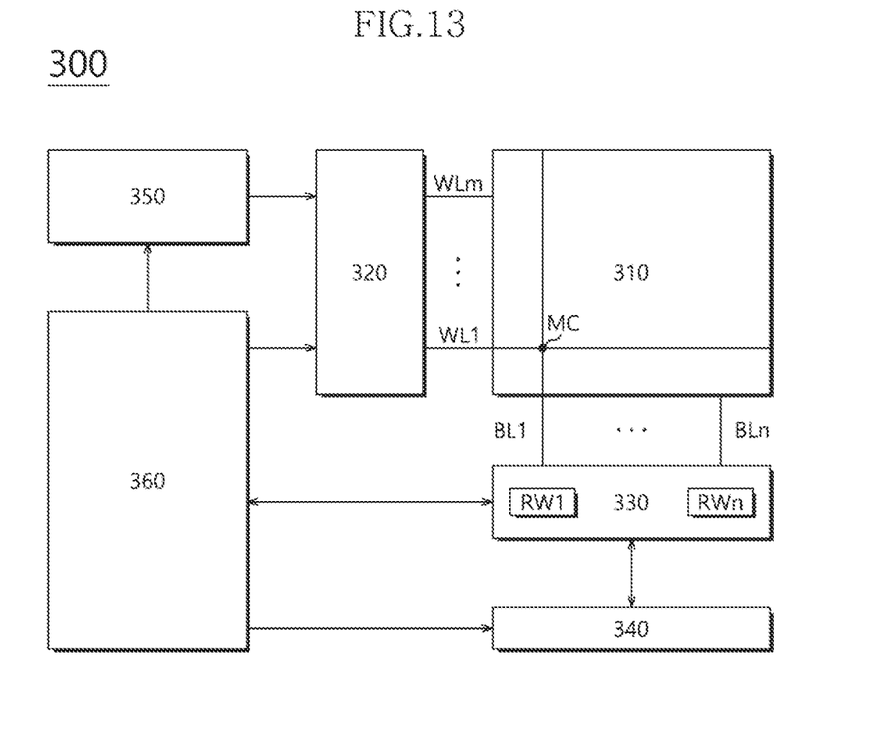
FIG. 13 is a block diagram illustrating a nonvolatile memory device included in a data storage device in accordance with an embodiment.

The server system 5300 may include a host device 5100 and a memory system 5200. The memory system 5200 may be configured as the memory system 10 shown in FIG. 1, the data storage device 1200 shown in FIG. 9, the memory system 3200 shown in FIG. 10, or the memory system 4200 shown in FIG. 11. FIG. 13 is a block diagram illustrating a nonvolatile memory device 300 included in a data storage device, such as the data storage device 10, in accordance with an embodiment. Referring to FIG. 13, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure extending perpendicularly to the flat surface of a semiconductor substrate. Moreover, the three-dimensional memory array means a structure including NAND strings which memory cells comprised of NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art in light of the present disclosure that the embodiments described are examples only. Accordingly, the present invention is not limited to the described embodiments. Rather, the present invention encompasses all modifications and variations that fall within the scope of the claims.

What is claimed is:

1. A data storage device comprising:
a storage configured to store data in a plurality of physical storage spaces to which physical addresses are assigned, respectively; and
a controller configured to control the storage,
wherein the controller includes a mapping table of the physical addresses corresponding to logical addresses managed by a host, and
wherein the controller is further configured to:
read data, in a primary read operation, from a physical storage space of a physical address corresponding to a logical address requested to be read by the host among the plurality of physical storage spaces according to the mapping table;
obtain a normal physical address corresponding to the logical address requested to be read through the mapping table when the data read in the primary read operation is erased data; and
read data, in a secondary read operation, from a physical storage space of the normal physical address,
wherein the controller is further configured to:
search the mapping table for physical addresses mapped to neighboring logical addresses of the logical address requested to be read;
search a missing address within the physical addresses mapped to neighboring logical addresses; and
determine the missing address as the normal physical address.

2. The data storage device according to claim 1,
wherein the controller is further configured to detect physical addresses mapped to a set number of logical addresses before and after the logical address requested to be read among the physical addresses of the mapping table, and,
wherein the controller obtains, when the detected physical addresses have a sequential pattern in which the physical addresses are sequentially increased or decreased according to an order of the logical addresses, the missing address of the physical addresses having the sequential pattern as the normal physical address.

3. The data storage device according to claim 1,
wherein the controller is further configured to:
detect physical addresses mapped to a set number of logical addresses before and after the logical address requested to be read among the physical addresses of the mapping table;
align, when the detected physical addresses do not have a sequential pattern in which the physical addresses sequentially increase or decrease according to an order of the logical addresses, the physical addresses in the mapping table, except for physical addresses mapped to the logical address requested to be read; and
search for the missing address within the aligned physical addresses, and to determines the missing address as the normal physical address.

4. The data storage device according to claim 1, wherein the controller is further configured to:
detect physical addresses mapped to a set number of logical addresses before and after the logical address requested to be read among the physical addresses of the mapping table;
align, when the detected physical addresses do not have a sequential pattern in which the physical addresses sequentially increase or decrease according to an order of the logical addresses, the physical addresses in the mapping table, except for physical addresses mapped to the logical address requested to be read;
search for the missing address within the aligned physical addresses; and
report occurrence of a read error to the host when there is no missing address.

5. An operation method of a data storage device including a storage that stores data in a plurality of physical storage spaces to which physical addresses are assigned, respectively, and a controller that controls the storage and includes a mapping table of the physical addresses corresponding to logical addresses managed by a host, the operation method comprising:
reading, in a primary reading operation performed by the controller, data from a physical storage space assigned a physical address corresponding to a logical address requested to be read by the host among the plurality of physical storage spaces according to the mapping table;
determining, by the controller, whether the data read in the primary reading operation is erased data;
obtaining, by the controller, when the data read in the primary reading operation is erased data, a normal physical address corresponding to the logical address requested to be read through the mapping table; and
reading, in a secondary reading operation performed by the controller data from a physical storage space of the normal physical address,
wherein further comprising:
searching, by the controller, the mapping table for physical addresses mapped to neighboring logical addresses of the logical address requested to be read;
searching, by the controller, a missing address within the physical addresses mapped to neighboring logical addresses; and
determining, by the controller, the missing address as the normal physical address.

6. The operation method according to claim 5, further comprising detecting, by the controller, physical addresses mapped to a set number of logical addresses before and after the logical address is requested to be read among the physical addresses of the mapping table,
wherein the controller obtains, when the detected physical addresses have a sequential pattern in which the physical addresses sequentially increase or decrease according to an order of the logical addresses, the missing address of the physical addresses having the sequential pattern as the normal physical address.

7. The operation method according to claim 5, further comprising:
detecting, by the controller, physical addresses mapped to a set number of logical addresses before and after the logical address requested to be read among the physical addresses of the mapping table;
aligning, by the controller, when the detected physical addresses do not have the sequential pattern, the physical addresses in the mapping table, except for physical addresses mapped to the logical address requested to be read; and
searching, by the controller, for the missing address within the aligned physical addresses, and
wherein the controller determines the missing address as the normal physical address.

8. The operation method according to claim 5, further comprising:
detecting, by the controller, physical addresses mapped to a set number of logical addresses before and after the logical address requested to be read among the physical addresses of the mapping table;

aligning, by the controller, when the detected physical addresses do not have the sequential pattern, the physical addresses in the mapping table, except for physical addresses mapped to the logical address requested to be read;

searching, by the controller, for the missing address within the aligned physical addresses; and reporting, by the controller, occurrence of a read error to the host when there is no missing address.

9. A controller that controls a storage for storing data in a plurality of physical storage spaces to which physical addresses are assigned, respectively, the controller comprising:

a mapping table configured to store mapping information of the physical addresses corresponding to logical addresses managed by a host;

an abnormal pattern detector configured to determine whether data, which is read in a primary read operation from a physical storage space assigned a physical address corresponding to a logical address requested to be read by the host among the plurality of physical storage spaces according to the mapping table, is erased data;

a write pattern determination component configured to determine whether physical addresses mapped to a set number of logical addresses before and after the logical address requested to be read among the physical addresses of the mapping table have a sequential pattern in which the physical addresses sequentially increase or decrease according to an order of the logical addresses when the data read in the primary read operation is the erased data;

an address determination component configured to obtain a normal physical address corresponding to the logical address requested to be read, on the basis of the determination of the write pattern determination component; and a reading circuit configured to read data in a secondary read operation from a physical storage space of the normal physical address.

10. The controller according to claim 9, wherein the write pattern determination component is configured to search the map table for physical addresses mapped to neighboring logical addresses of the logical address requested to be read, and wherein the address determination component obtains the normal physical address corresponding to the logical address requested to be read.

11. The controller according to claim 10, wherein the write pattern determination component is further configured to detect physical addresses mapped to a set number of logical addresses before and after the logical address requested to be read among the physical addresses of the mapping table, and, wherein the address determination component obtains, when the detected physical addresses have a sequential pattern in which the physical addresses are sequentially increased or decreased according to an order of the logical addresses, a missing address of the physical addresses having the sequential pattern as the normal physical address.

12. The controller according to claim 10, wherein the write pattern determination component is further configured to detect physical addresses mapped to a set number of logical addresses before and after the logical address requested to be read among the physical addresses of the mapping table, wherein the address determination component is further configured to:

align, when the detected physical addresses do not have the sequential pattern the physical addresses in the mapping table, except for physical addresses mapped to the logical address requested to be read; and search for a missing address within the aligned physical addresses, and wherein the address determination component obtains the missing address as the normal physical address.

13. The controller according to claim 12, wherein the address determination component is further configured to report, when there is no missing address, occurrence of a read error to the host.

* * * * *